(12) United States Patent
Dohi

(10) Patent No.: US 11,880,609 B2
(45) Date of Patent: Jan. 23, 2024

(54) USB MEMORY AND MANUFACTURING METHOD THEREOF

(71) Applicant: Kioxia Corporation, Tokyo (JP)

(72) Inventor: Masayuki Dohi, Yokohama (JP)

(73) Assignee: Kioxia Corporation, Tokyo (JP)

( * ) Notice: Subject to any disclaimer, the term of this patent is extended or adjusted under 35 U.S.C. 154(b) by 319 days.

(21) Appl. No.: 17/201,511

(22) Filed: Mar. 15, 2021

(65) Prior Publication Data

US 2022/0083284 A1 Mar. 17, 2022

(30) Foreign Application Priority Data

Sep. 17, 2020 (JP) .................................. 2020-156719

(51) Int. Cl.
| | |
|---|---|
| *G06F 3/00* | (2006.01) |
| *G06F 3/06* | (2006.01) |
| *G06F 12/02* | (2006.01) |
| *G06F 13/40* | (2006.01) |

(52) U.S. Cl.
CPC ........ *G06F 3/0679* (2013.01); *G06F 12/0246* (2013.01); *G06F 13/409* (2013.01); *G06F 13/4068* (2013.01)

(58) Field of Classification Search
CPC ............... G06F 3/0679; G06F 12/0246; G06F 13/4068; G06F 13/409; H05K 1/181; H05K 3/321; H05K 2201/10159
USPC ........................................................ 361/752
See application file for complete search history.

(56) References Cited

U.S. PATENT DOCUMENTS

| | | | |
|---|---|---|---|
| 7,608,787 B2 | 10/2009 | Takemoto et al. | |
| 2007/0295982 A1* | 12/2007 | Ryu | G06K 19/07743 438/126 |
| 2008/0218799 A1* | 9/2008 | Hiew | G06F 1/1632 358/1.16 |
| 2009/0190277 A1* | 7/2009 | Hiew | G06F 1/1632 361/56 |
| 2010/0217910 A1 | 8/2010 | Bryant-Rich | |
| 2013/0252466 A1* | 9/2013 | Chen | H01R 13/6658 439/682 |

FOREIGN PATENT DOCUMENTS

| | | | |
|---|---|---|---|
| JP | 2007-109198 A | 4/2007 | |
| JP | 2016173910 A | * 9/2016 | ............. H01R 12/57 |
| JP | 2020-1281 A | 1/2020 | |
| TW | 201234545 A | 8/2012 | |

* cited by examiner

*Primary Examiner* — Anatoly Vortman
*Assistant Examiner* — Zhengfu J Feng
(74) *Attorney, Agent, or Firm* — Oblon, McClelland, Maier & Neustadt, L.L.P.

(57) ABSTRACT

A USB memory according to a present embodiment is the USB memory capable of data transfer by being connected with a receptacle, and includes a wiring board, a semiconductor chip, a connector, and an adhesive film. The wiring board includes wiring. The semiconductor chip is electrically connected with the wiring. The connector includes a first connection, a second connection, and a holder. The first connection is electrically connected with the semiconductor chip via the wiring. The second connection is electrically connected with the first connection and is connectable with the receptacle. The holder holds the first connection and the second connection. The adhesive film is provided at least between the wiring board and the holder.

19 Claims, 5 Drawing Sheets

USB MEMORY AND MANUFACTURING METHOD THEREOF

CROSS REFERENCE TO RELATED APPLICATIONS

This application is based upon and claims the benefit of priority from the prior Japanese Patent Application No. 2020-156719, filed on Sep. 17, 2020, the entire contents of which are incorporated herein by reference.

FIELD

The embodiments of the present invention relate to a USB memory and a manufacturing method thereof.

BACKGROUND

As one connection standard of connecting information equipment such as a computer with peripheral equipment, a USB (Universal Serial Bus) is known. A USB memory is in some cases designed such that a casing of a product also functions as a commonly used metal shell for miniaturization or designability or the like. In this case, for example, a connector component (plug) used for electrical connection with a receptacle is mounted on a substrate inside the USB memory by solder connection in a state without a metal shell.

However, in solder mounting, since solder is in a paste form, a solder supply amount may be likely to be instable. In addition, a height (mounting height) of the connector component to the substrate at the time of the solder mounting is affected by a mounter for mounting the connector component onto the substrate and surface tension of the solder. Therefore, it is difficult to actively control (adjust) the mounting height. In this case, a design freedom of a USB memory including fitting adjustment of the receptacle and the connector component or the like becomes low.

DETAILED DESCRIPTION

Figure 1:
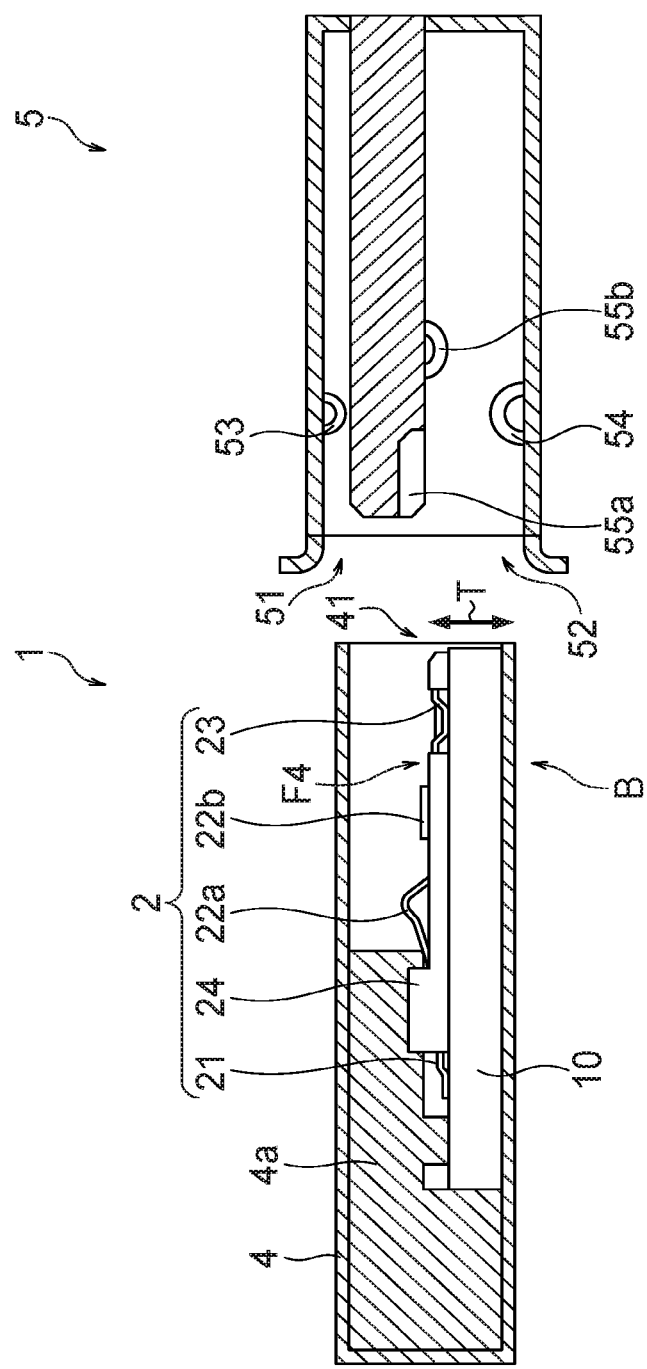
FIG. 1 is a cross sectional view illustrating a configuration example of a USB memory according to a first embodiment.

Embodiments will now be explained with reference to the accompanying drawings. The present invention is not limited to the embodiments. In the present specification and the drawings, elements identical to those described in the foregoing drawings are denoted by like reference characters and detailed explanations thereof are omitted as appropriate.

A USB memory according to the present embodiment is the USB memory capable of data transfer by being connected with a receptacle, and includes a wiring board, a semiconductor chip, a connector, and an adhesive film. The wiring board includes wiring. The semiconductor chip is electrically connected with the wiring. The connector includes a first connection, a second connection, and a holder. The first connection is electrically connected with the semiconductor chip via the wiring. The second connection is electrically connected with the first connection and is connectable with the receptacle. The holder holds the first connection and the second connection. The adhesive film is provided at least between the wiring board and the holder.

First Embodiment

FIG. 1 is a cross sectional view illustrating a configuration example of a USB memory 1 and a receptacle 5 according to the first embodiment. The USB memory 1 is a plug integrated type semiconductor device capable of data transfer by a USB 3.0 for example by being connected with the receptacle 5. The plug integrated type USB memory 1 may not be provided with a metal shell.

The USB memory 1 includes a casing 4, a fixer 4a, a circuit board 10, and a connector 2.

The casing 4 houses the circuit board 10 and the connector 2. The casing 4 includes an opening 41. For the casing 4, for example, a metal such as a zinc alloy is used. Note that, for the casing 4, for example, plastic such as ABS (Acrylonitrile Butadiene Styrene) or PC (Polycarbonate) may be used. The casing 4 may be obtained by sticking together a plurality of casing members including grooves such that the grooves face each other, for example. Note that a shape of the casing 4 is not limited to the example illustrated in FIG. 1. The casing 4 may be provided at least on an opposite side of the connector 2 to a wiring board 11, that is, below the circuit board 10. Therefore, the casing 4 above the circuit board 10 and the connector 2 may not be provided, and the circuit board 10 and the connector 2 may be exposed.

The fixer 4a is provided inside the opening 41 and fixes the circuit board 10 and the connector 2 to the casing 4.

Next, the circuit board 10 and the connector 2 of the USB memory 1 will be described.

Figure 2:
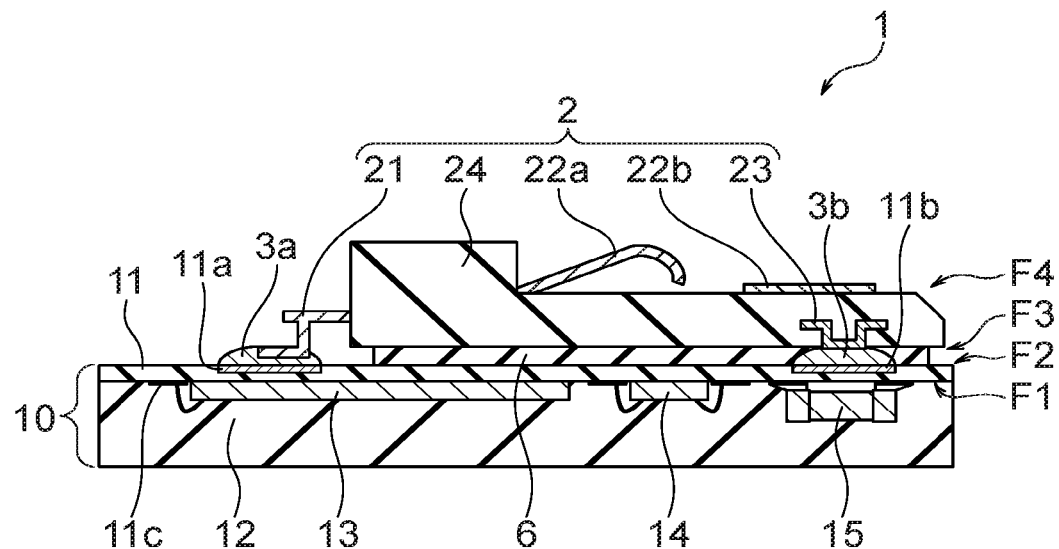
FIG. 2 is a cross sectional view illustrating a configuration example of a circuit board and a connector according to the first embodiment.

FIG. 2 is a cross sectional view illustrating a configuration example of the circuit board 10 and the connector 2 according to the first embodiment. FIG. 2 is also an enlarged view for which a periphery of the connector 2 illustrated in FIG. 1 is enlarged.

As illustrated in FIG. 2, the USB memory 1 further includes conductive members 3a and 3b, and an adhesive film 6. For the conductive members 3a and 3b, for example, a conductive material such as solder is used. Note that details of the adhesive film 6 will be described later.

As illustrated in FIG. 1, the circuit board 10 is provided inside the opening 41. The circuit board 10 is preferably fixed by the casing 4. In addition, as illustrated in FIG. 2, the circuit board 10 includes the wiring board 11, a memory chip 13, a controller chip 14, an electronic component 15, and a sealing resin layer 12.

The wiring board 11 includes wiring (not illustrated), and pads 11a, 11b and 11c. The pads 11a, 11b and 11c are exposed from the wiring board 11, and electrically connected with the wiring inside the wiring board 11. The wiring includes, for example, signal wiring, power supply wiring and ground wiring. Between the pads 11a and 11b and between the plurality of pads 11c, for example, an insulator (not illustrated) such as solder resist is provided. As the wiring board 11, for example, a resin substrate of glass epoxy or the like including a wiring layer provided with the pads 11a, 11b and 11c provided on a surface may be used.

In addition, the wiring board 11 includes a surface F1 and a surface F2 on the opposite side of the surface F1. In the example illustrated in FIG. 2, the surface F1 is a lower surface and the surface F2 is an upper surface. In the example illustrated in FIG. 2, the memory chip 13, the controller chip 14 and the electronic component 15 are loaded on the surface F1 of the wiring board 11, and are electrically connected with the plurality of pads 11c mounted on the surface F1. The controller chip 14 is electrically connected with the memory chip 13 via the wiring of the wiring board 11. Note that semiconductor chips may not be limited to the memory chip 13 and the controller chip 14 and may be any other semiconductor chips. In addition, a position of the memory chip 13 and a position of the controller chip 14 may be reversed.

The memory chip 13 is electrically connected with the wiring inside the wiring board 11. The memory chip 13 includes, for example, a stack of a plurality of semiconductor chips, and the plurality of semiconductor chips are bonded to each other so as to be partially superimposed holding an adhesive layer therebetween. The plurality of semiconductor chips are electrically connected by connecting electrodes provided on the individual semiconductor chips by wire bonding. As the semiconductor chip, for example, a memory chip including a storage element such as a NAND flash memory may be used. At the time, the semiconductor chip may include a decoder or the like in addition to a memory cell.

The controller chip 14 is electrically connected with the wiring inside the wiring board 11. The controller chip 14 controls operations such as data write and data read to/from the memory chip 13. The controller chip 14 is formed from the semiconductor chip, and is electrically connected with the wiring board 11 by connecting an electrode pad provided on the semiconductor chip and a connection pad provided on the wiring board 11 by wire bonding, for example.

A connection method of the memory chip 13 and the controller chip 14 with the wiring board 11 is not limited to the wire bonding, and wireless bonding such as flip-chip bonding or tape automated bonding may be used. In addition, a three-dimensional mounting structure such as a TSV (Through Silicon Via) system for which the memory chip 13 and the controller chip 14 are stacked on the surface F1 of the wiring board 11 or the like may be used.

The electronic component 15 is a component used for the operation of the USB memory 1. The electronic component 15 includes a capacitor and a resistor, for example.

The sealing resin layer 12 contains an inorganic filler (for example, $SiO_2$), for example. The sealing resin layer 12 is formed by a molding method such as a transfer molding method, a compression molding method or an injection molding method using a sealing resin for which the inorganic filler is mixed with an organic resin or the like, for example.

The connector 2 is provided above the surface F2 of the wiring board 11. The connector 2 is used to electrically connect the semiconductor chips such as the memory chip 13 and the controller chip 14 and the receptacle 5. The connector 2 includes a holder 24, and connections 21, 22a, 22b and 23.

The holder 24 holds (supports) the connections 21, 22a, 22b and 23. The holder 24 is provided so as to fix the connections 21, 22a, 22b and 23, for example. For the holder 24, for example, a resin is used. The holder 24 includes a surface F3 and a surface F4 on the opposite side of the surface F3. The surface F3 is the surface facing the wiring board 11. On the surface F4, the connections 22a and 22b are provided.

The connection 21 is electrically connected with the semiconductor chip (the memory chip 13 or the controller chip 14, for example) via the wiring inside the wiring board 11. In more detail, the connection 21 is connected with the pad 11a via the conductive member 3a. That is, the conductive member 3a electrically connects the pad 11a and the connection 21. In the example illustrated in FIG. 2, the connection 21 is provided so as to be projected from a side face of the holder 24.

The connections 22a and 22b are electrically connected with the connection 21 and are provided so as to be connectable with the receptacle 5. In addition, the connections 22a and 22b are arranged on the surface F4 of the holder 24 on the opposite side of the surface F3 facing the wiring board 11.

Figure 3:
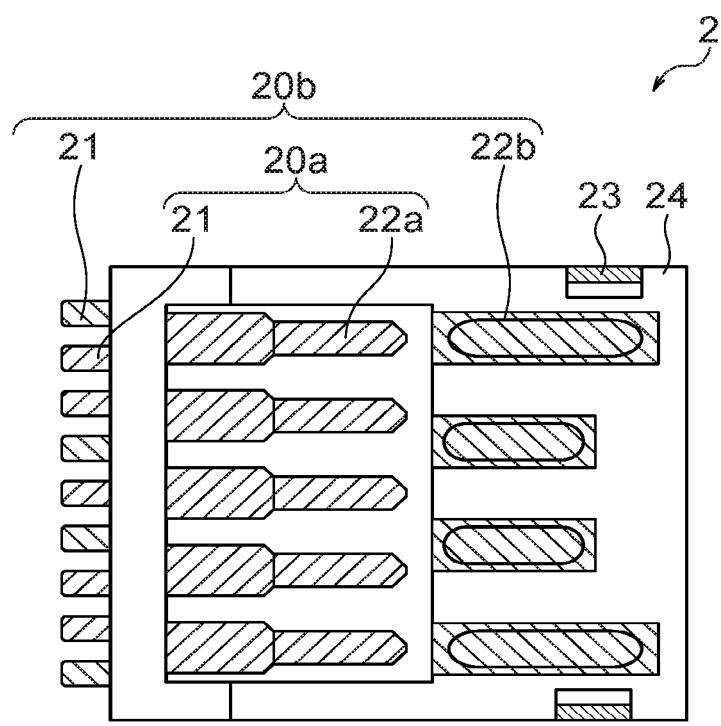
FIG. 3 is a plan view illustrating a configuration example of the connector according to the first embodiment.

FIG. 3 is a plan view illustrating a configuration example of the connector 2 according to the first embodiment. FIG. 3 is a diagram viewing the connector 2 in FIG. 2 from above the surface F4, for example.

The connection 22a is a signal terminal, for example. The connection 22a includes five terminals required for high-speed transfer by USB 3.0, for example. The connection 22b includes four terminals required for data transfer by USB 2.0 or USB 3.0, for example.

As the connection 22a, external connection terminals required for the high-speed transfer by USB 3.0 such as a ground terminal (GND), signal terminals (SSTX+, SSTX−) for transmission data signals for the high-speed transfer which are differential signals, and signal terminals (SSRX+, SSRX−) for reception data signals for the high-speed transfer which are the differential signals or the like are provided.

As the connection 22b, external connection terminals required for the data transfer by USB 2.0 or USB 3.0 such as a power terminal (VBUS), signal terminals (D+, D−) for data signals for normal transfer which are the differential signals, and a ground terminal (GND) are provided.

As illustrated in FIG. 3, the connector 2 includes nine connections 21, five connections 22a and four connections 22b. One connection 21 is electrically connected with either one of the connection 22a and the connection 22b. In more detail, one connection 21 and one connection 22a may be both ends of one terminal member 20a, for example. Similarly, one connection 21 and one connection 22b may be both ends of one terminal member 20b, for example. Note that, in the example illustrated in FIG. 2 and FIG. 3, an intermediate of the terminal members 20a and 20b is covered with the holder 24.

As illustrated in FIG. 2, the connection 22a preferably includes a curved surface which is convex on an upper side. The connection 22a preferably includes a spring property. For the connection 22a (terminal member 20a), for example, a material capable of imparting the spring property such as a copper alloy (for example, beryllium copper, phosphor bronze or cobalt copper) or a nickel alloy (for example, beryllium nickel) is used. The material of the connection 22b (terminal member 20b) may be same as the material of the connection 22a or may be different.

The connection 23 is connected with the pad 11b via the conductive member 3b. That is, the conductive member 3b electrically connects the connection 23 and the pad 11b. The connection 23 is, for example, a ground terminal and is electrically connected with the ground wiring inside the wiring board 11. The connection 23 includes a function of fixing the connector 2 to the wiring board 11. It is because, as illustrated in FIG. 3, there is a possibility that the connector 2 becomes instable just by connection of one side at an outer edge of the holder 24 by the connection 21. Therefore, the connection 23 may not be the terminal used for the data transfer.

Here, as illustrated in FIG. 1, in order to connect the USB memory 1 with the receptacle 5, the connector 2 needs to be connected with the receptacle 5.

In the example illustrated in FIG. 1, the receptacle 5 includes openings 51 and 52, fixing members 53 and 54 and receptacle connections 55a and 55b. The fixing member 53 is provided inside the opening 51. The fixing member 54 and the receptacle connections 55a and 55b are provided inside the opening 52.

The fixing members 53 and 54 have the spring property, and pressurize the casing 4 from above and below. Thus, the casing 4 inserted into the openings 51 and 52 can be fixed. In addition, the fixing member 54 can pressurize the connections 22a and 22b inserted into the opening 52 upwards to be brought into contact with the receptacle connections 55a and 55b respectively. In more detail, the connection 22a is brought into contact with the receptacle connection 55a, and the connection 22b is brought into contact with the receptacle connection 55b. Thus, between the USB memory 1 and information equipment including the receptacle 5, the data transfer by a USB and power supply to the USB memory 1 can be performed.

The connection 22a and the receptacle connection 55a are electrically connected on an upper surface of the connection 22a. The connection 22a has the curved surface which is convex on the upper side and the spring property as described above. When the casing 4 is pressurized upwards by the fixing member 54, the curved surface of the connection 22a is brought into contact with the receptacle connection 55a and is also pushed downwards. Thus, force of the connection 22a to return to an original state by the spring property is applied to the receptacle connection 55a. As a result, contact strength of the connection 22a and the receptacle connection 55a can be increased, and it can be easy to electrically connect the connection 22a and the receptacle connection 55a.

Note that the electrical connection of the connection 22b and the receptacle connection 55b may be similar to the electrical connection of the connection 22a and the receptacle connection 55a. The receptacle connection 55b has a curved surface which is convex on a lower side and the spring property and functions almost similarly to the connection 22a.

In this way, in order to connect the connector 2 with the receptacle 5, it is needed to insert the connector 2 into the opening 52 and to bring the connections 22a and 22b into contact with the receptacle connections 55a and 55b. Therefore, it is needed to appropriately design a positional relation of the connector 2 and the receptacle 5.

Generally, for an internal structure of the receptacle 5, a dimension is defined by a standard. A thickness T from a bottom surface B of the casing 4 to the surface F4 of the connector 2 is, for example, designed so as to be within a predetermined range according to the dimension of the receptacle 5. One of factors that determine the thickness T is a height of the connector 2 to the circuit board 10 (wiring board 11). For example, in a case where the height of the connector 2 is high, since the connector 2 interferes with the receptacle 5, it becomes difficult to insert the connector 2 into the opening 52 of the receptacle. On the other hand, in the case where the height of the connector 2 is low, even when the connector 2 is inserted into the opening 52, a gap is formed between the connections 22a and 22b and the receptacle connections 55a and 55b. In this case, since the connections 22a and 22b and the receptacle connections 55a and 55b are not brought into contact, the electrical connection is not obtained. Therefore, it is needed to appropriately control (adjust) the height of the connector 2.

Then, as illustrated in FIG. 2, the adhesive film 6 is provided at least between the wiring board 11 and the holder 24. The adhesive film 6 is a film-like adhesive agent. Generally, processing accuracy of a film thickness is extremely high. That is, by fixing the connector 2 to the wiring board 11 by the adhesive film 6 the thickness of which is easy to control, the height of the connector 2 can be more highly accurately controlled. As a result, design of the USB memory 1 is made easier, and a design freedom can be improved. The adhesive film 6 is preferably provided on an almost entire surface of the surface F3 of the holder 24. Thus, variation of the height of the connector 2 within the surface F3 and inclination of the connector 2 can be suppressed. The adhesive film 6 is, for example, a DAF (Die Attach Film) or an NCF (Non Conductive Film). Note that, without being limited thereto, the adhesive film 6 may be a thermosetting resin such as epoxy, for example. In addition, the adhesive film 6 preferably has a heat resistance property during reflow for solder connection or the like.

Further, the adhesive film 6 is provided at such a thickness that the connections 22a and 22b can be connected to the receptacle 5. In more detail, the adhesive film 6 is provided at such a thickness that at least a part of the connector 2 can be inserted into the opening 52 of the receptacle 5 and that the connections 22a and 22b can be brought into contact with the receptacle connections 55a and 55b provided on an inner side face of the opening 52. Further, in more detail, the adhesive film 6 is provided at such a thickness that at least a part of the connector 2 can be inserted between the fixing member 54 provided so as to face the receptacle connections 55a and 55b on the inner side face of the opening 52 for fixing the USB memory 1 inside the opening 52 and the receptacle connections 55a and 55b and that the connections 22a and 22b can be brought into contact with the receptacle connections 55a and 55b.

Next, a manufacturing method of the USB memory 1 will be described.

Figure 4:
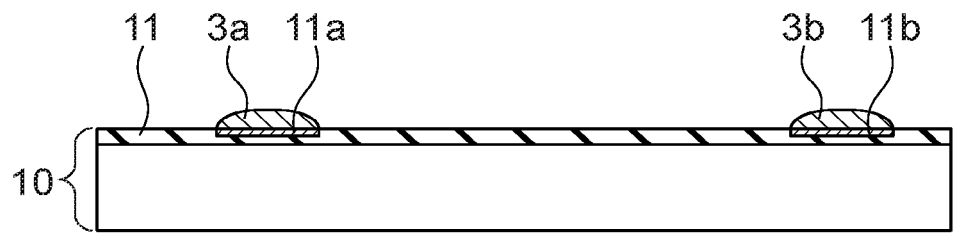
FIG. 4 is a cross sectional view illustrating an example of a manufacturing method of the USB memory according to the first embodiment.
Figure 5:
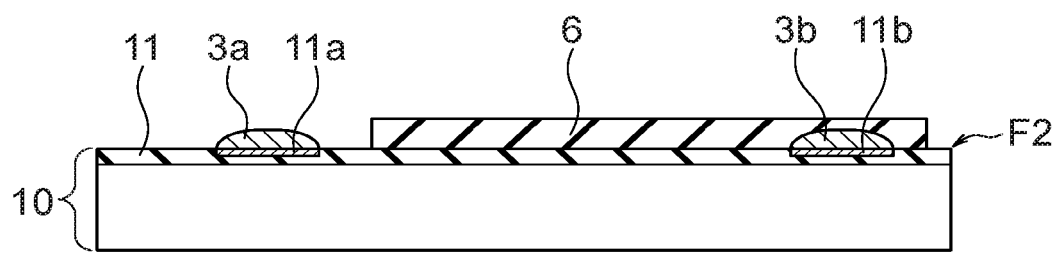
FIG. 5 is a cross sectional view illustrating an example of the manufacturing method of the USB memory following FIG. 4.
Figure 6:
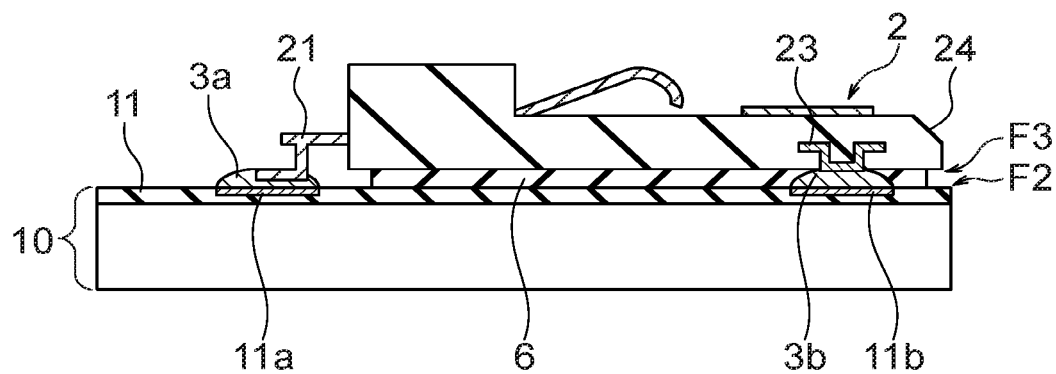
FIG. 6 is a cross sectional view illustrating an example of the manufacturing method of the USB memory following FIG. 5.

FIGS. 4-6 are cross sectional views illustrating an example of the manufacturing method of the USB memory 1 according to the first embodiment. Note that, in FIGS. 4-6, the memory chip 13, the controller chip 14 and the electronic component 15 are omitted.

First, as illustrated in FIG. 4, solder paste is printed on the circuit board 10. Thereafter, solder is cured by reflow. That is, the pads 11a and 11b are provided with conductive members 3a and 3b.

Next, as illustrated in FIG. 5, the adhesive film 6 is stuck to the surface F2 of the wiring board 11. That is, the adhesive film 6 is provided on the wiring board 11. In more detail, on the wiring board 11, the adhesive film 6 of the thickness adjusted such that a distance between the wiring board 11 and the holder 24 comes to a predetermined distance is provided. That is, for the adhesive film 6, the thickness is adjusted so as to obtain a desired height of the connector 2. Note that, in the example illustrated in FIG. 5, the adhesive film 6 is separated beforehand.

Then, as illustrated in FIG. 6, the connector 2 is mounted. For example, after mounting the connector 2 onto the circuit board 10, the reflow for the connection of the conductive members 3a and 3b and the connections 21 and 23 and curing of the adhesive film 6 are performed. Note that either of the reflow and the curing may be performed first. Thus, the USB memory 1 illustrated in FIG. 2 is obtained. That is, the holder 24 of the connector 2 is bonded to the wiring board 11 via the adhesive film 6, and the connection 21 is electrically connected with the semiconductor chip via the wiring inside the wiring board 11.

Thereafter, the USB memory 1 is fixed to the casing 4.

Note that, in a process illustrated in FIG. 5, for example, the adhesive film 6 is stuck to a sheet substrate where a semiconductor element is formed, and the circuit board 10 is separated by dicing thereafter. Thus, compared to the case of forming the separated adhesive film 6 for each separated circuit board 10, mass production of the USB memory 1 is facilitated. In addition, in the case where the adhesive film 6 is stuck before separation of the circuit board 10, the adhesive film 6 may be stuck to the circuit board 10 in a sheet shape (before separation). In this case, the adhesive film 6 may be provided not only in an area corresponding to the surface F3 of the holder 24 but also on the almost entire surface of the surface F2 of the wiring board 11. It is because that the connection 21 breaks through the adhesive film 6 and is brought into contact with the conductive member 3a in the process in FIG. 6. Note that, without being limited to the method described above, the separated adhesive film 6 may be formed for each separated circuit board 10.

As above, according to the first embodiment, the connector 2 includes the holder 24 which holds the connection 21 and the connections 22a and 22b. In addition, the adhesive film 6 is provided at least between the wiring board 11 and the holder 24. The processing accuracy of the thickness of the film used for the adhesive film 6 is extremely high. Thus, the height of the connector 2 to the wiring board 11 can be more highly accurately controlled.

In the case where the adhesive film 6 is not provided, the connector 2 and the circuit board 10 need to be connected and fixed just by the solder (conductive members 3a and 3b). However, since the solder is in a paste form, a supply amount of the solder in some cases become instable. In addition, the height (mounting height) of a connector component to the substrate in solder mounting is affected by a mounter for mounting the connector component onto the substrate and surface tension of the solder. Therefore, it is difficult to actively control (adjust) the mounting height, and the variation of the height (connection height) of the connector 2 to the wiring board 11 after the solder mounting increases. In the case of the solder mounting, the variation of the connection height is, for example, about ±50 µm. The thickness T illustrated in FIG. 1 is affected not only by the variation of the connection height but also thickness variation of the circuit board 10 and dimension variation of the casing 4. Therefore, the thickness T needs to be designed while taking balance of the individual variation into consideration. For example, when the variation of the connection height increases, since there is no margin in the variation of the other components, design difficulty becomes extremely high.

In contrast, in the first embodiment, the adhesive film 6 the thickness variation of which is smaller than the variation of the connection height in the solder mounting supports the connector 2. Processing variation of the thickness of the adhesive film 6 is, for example, about ±10 µm. Note that the thickness of the adhesive film 6 is, for example, about 50 µm to about 100 µm. Thus, the height of the connector 2 can be more easily adjusted, and the variation of the height of the connector 2 can be suppressed. That is, the height of the connector 2 can be more accurately adjusted. As a result, the variation of the other components such as the thickness variation of the circuit board 10 and the dimension variation of the casing 4 can have the margin, and the design of the USB memory 1 in consideration of interference and non-connection with the receptacle 5 or the like can be made easier.

Note that the USB memory 1 is not limited to the case of performing the data transfer by USB 3.0. When it is the standard using similar signals, the USB memory 1 may be used for the data transfer by other USB standards such as USB 2.0 or Type-C, for example. In this case, for example, the number, arrangement and shape or the like of the connections 21, 22a, 22b and 23 may be changed.

In addition, a mounting method of the memory chip 13, the controller chip 14 and the electronic component 15 on the circuit board 10 illustrated in FIG. 2 is COB (Chip On Board). However, the mounting method is not limited thereto, and may be SMT (Surface Mount Technology) or the like, for example. In this case, for example, a semiconductor package is mounted on the wiring board 11.

In addition, when the connector 2 is fixed to the wiring board 11 by the adhesive film 6, the connection 23, the pad 11b and the conductive member 3b may not be provided.

(Modification)

Figure 7:
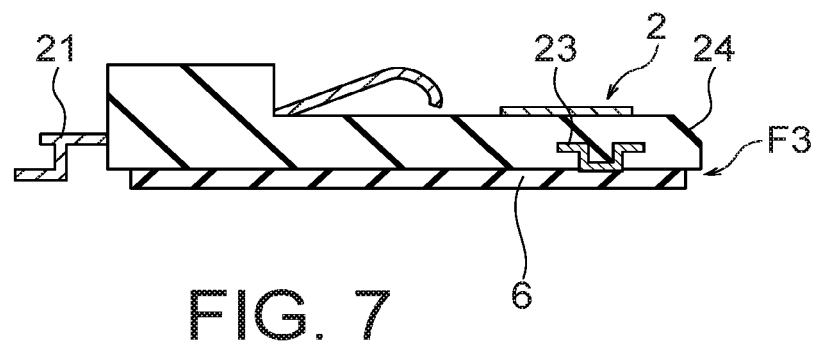
FIG. 7 is a cross sectional view illustrating an example of the manufacturing method of the USB memory according to a modification.
Figure 8:
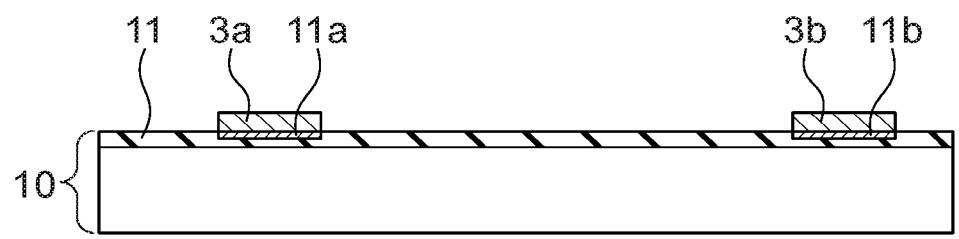
FIG. 8 is a cross sectional view illustrating an example of the manufacturing method of the USB memory following FIG. 7.
Figure 9:
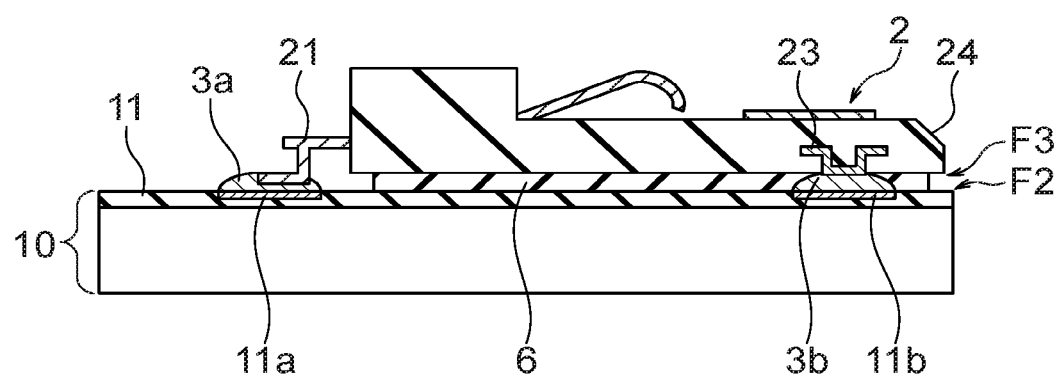
FIG. 9 is a cross sectional view illustrating an example of the manufacturing method of the USB memory following FIG. 8.

FIGS. 7-9 are cross sectional views illustrating an example of the manufacturing method of the USB memory 1 according to the modification. The modification of the first embodiment is different from the first embodiment at a point that the adhesive film 6 is stuck not to the wiring board 11 but to the holder 24.

First, as illustrated in FIG. 7, the adhesive film 6 is stuck to the surface F3 of the connector 2. That is, the holder 24 of the connector 2 is provided with the adhesive film 6. In more detail, the holder 24 is provided with the adhesive film 6 of the thickness adjusted such that the distance between the wiring board 11 and the holder 24 comes to the predetermined distance. Note that the adhesive film 6 is separated beforehand.

Next, as illustrated in FIG. 8, the solder paste is printed on the circuit board 10. That is, the pads 11a and 11b are provided with the conductive members 3a and 3b.

Then, as illustrated in FIG. 9, the connector 2 is mounted. That is, the holder 24 is bonded to the wiring board 11 via the adhesive film 6, and the connection 21 is electrically connected with the semiconductor chip via the wiring inside the wiring board 11.

The other configurations of the USB memory 1 according to the modification are similar to the corresponding configurations of the USB memory 1 according to the first embodiment so that the detailed description will be omitted. The USB memory 1 according to the modification can obtain the effect similar to that of the first embodiment.

Second Embodiment

Figure 10:
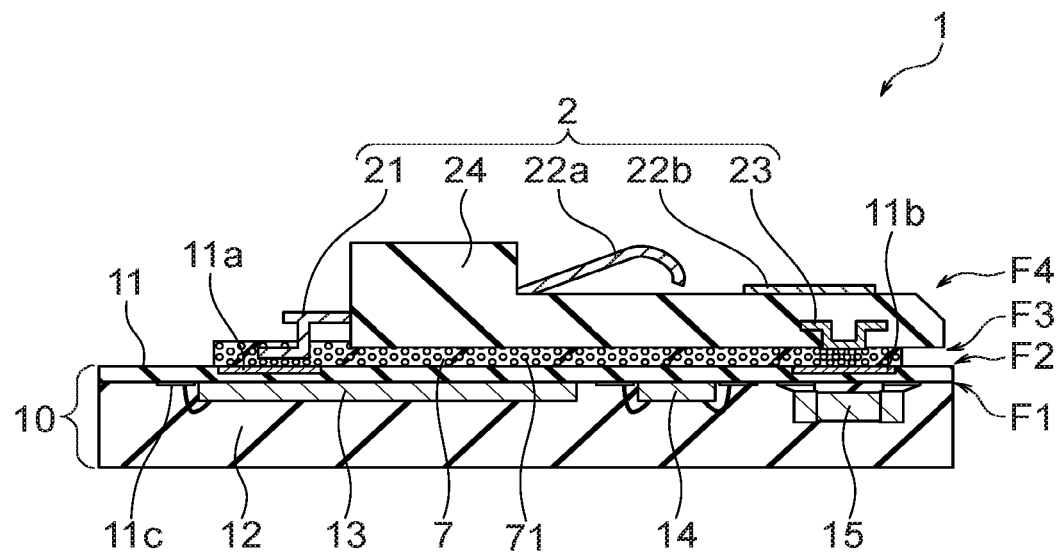
FIG. 10 is a cross sectional view illustrating a configuration example of the circuit board and the connector according to a second embodiment.

FIG. 10 is a cross sectional view illustrating a configuration example of the circuit board 10 and the connector according to the second embodiment. The second embodiment is different from the first embodiment at the point that the conductive members 3a and 3b are not provided and that the adhesive film has conductivity.

The USB memory 1 includes an adhesive film 7 instead of the adhesive film 6 according to the first embodiment. The adhesive film 7 may be almost similar to the adhesive film 6, and a difference from the adhesive film 6 will be described below.

The adhesive film 7 is provided between the pad 11a and the connection 21. In addition, the adhesive film 7 includes conductive particles 71 inside which electrically connect the pad 11a and the connection 21. Similarly, the adhesive film 7 includes the conductive particles 71 inside which electrically connect the connection 23 and the pad 11b. That is, the adhesive film 7 includes the thermosetting resin and the conductive particles 71. By the conductive particles 71, the conductive members 3a and 3b according to the first embodiment may not be provided.

In more detail, the adhesive film 7 is an anisotropic conductive film (ACF). During pressure bonding when connecting the connector 2 and the wiring board 11, by the conductive particles 71 getting close to each other, the connection 21 and the pad 11a, and the connection 23 and the pad 11b are electrically connected. Note that, at a position where a pressure during the pressure bonding is weak, the conductive particles 71 are separated from each other. Therefore, for example, the adjacent connections 21 and the connection 21 and the connection 23 are electrically cut off.

Figure 11:
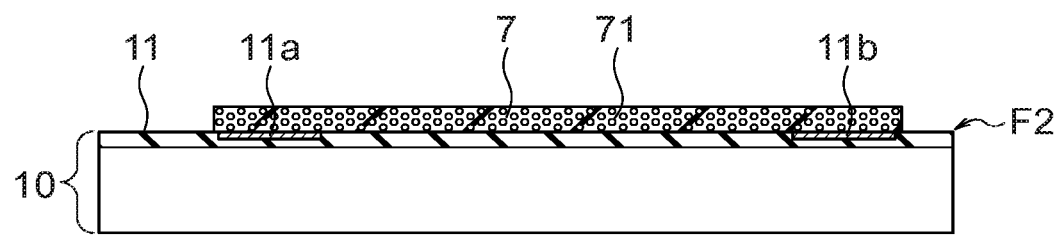
FIG. 11 is a cross sectional view illustrating an example of the manufacturing method of the USB memory according to the second embodiment.
Figure 12:
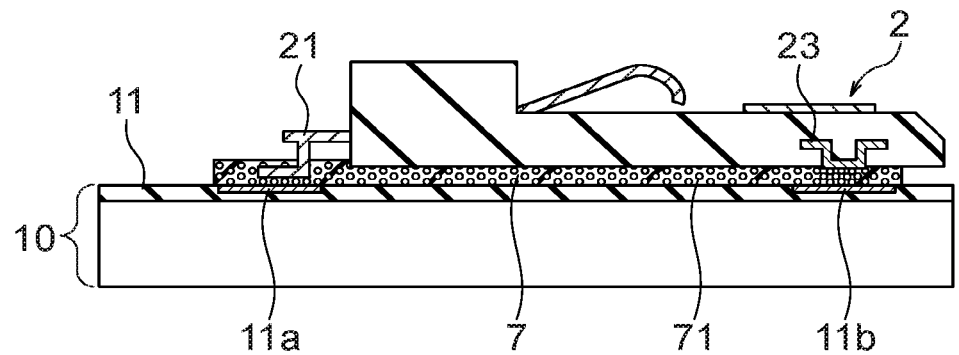
FIG. 12 is a cross sectional view illustrating an example of the manufacturing method of the USB memory following FIG. 11.

FIG. 11 and FIG. 12 are cross sectional views illustrating an example of the manufacturing method of the USB memory 1 according to the second embodiment.

First, as illustrated in FIG. 11, the adhesive film 7 is stuck to the surface F2 of the wiring board 11. The adhesive film 7 is provided so as to cover the pads 11a and 11b. Note that the conductive particles 71 are arranged almost equally within the adhesive film 7, for example.

Next, as illustrated in FIG. 12, the connector 2 is mounted. For example, after the connector 2 is mounted onto the circuit board 10, curing of the adhesive film 7 is performed. By the pressure when mounting the connector 2 onto the circuit board 10, density of the conductive particles 71 between the pad 11a and the connection 21 and between the pad 11b and the connection 23 is increased. Thus, the connector 2 and the circuit board 10 are electrically connected.

In this way, since fixation and electrical connection between the connector 2 and the circuit board 10 can be almost simultaneously performed by the adhesive film 7, the processes of solder printing and the reflow can be cut down.

The other configurations of the USB memory 1 according to the second embodiment are similar to the corresponding configurations of the USB memory 1 according to the first embodiment so that the detailed description will be omitted.

The USB memory 1 according to the second embodiment can obtain the effect similar to that of the first embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A USB memory capable of data transfer by being connected with a receptacle, the USB memory comprising:
   a wiring board including wiring;
   a semiconductor chip electrically connected with the wiring;
   a connector including a first connection electrically connected with the semiconductor chip via the wiring, a second connection electrically connected with the first connection and connectable with the receptacle, and a holder holding the first connection and the second connection; and
   an adhesive film provided at least between the wiring board and the holder,
   wherein
   the wiring board further includes a first pad exposed from the wiring board and electrically connected with the wiring, and
   the first connection is provided so as to be projected from a side face of the holder and electrically connected with the first pad at an outer edge of the holder.

2. The USB memory according to claim 1, wherein the second connection is arranged on a first surface of the holder on an opposite side of a second surface facing the wiring board.

3. The USB memory according to claim 1, wherein the adhesive film is provided at such a first thickness that at least a part of the connector is inserted into an opening of the receptacle and that the second connection is brought into contact with a receptacle connection provided on an inner side face of the opening.

4. The USB memory according to claim 3,
   wherein
   the adhesive film is provided at such a second thickness that the at least a part of the connector is inserted between a fixing member and the receptacle connection and that the second connection is brought into contact with the receptacle connection, and
   the fixing member is provided so as to face the receptacle connection on the inner side face of the opening and configured to fix the USB memory inside the opening.

5. The USB memory according to claim 3, further comprising
   a conductive member configured to electrically connect the first pad and the first connection.

6. The USB memory according to claim 3,
   wherein
   the adhesive film includes conductive particles provided between the first pad and the first connection and configured to electrically connect the first pad and the first connection.

7. The USB memory according to claim 6, wherein the adhesive film is an anisotropic conductive film.

8. The USB memory according to claim 1, further comprising
a conductive member configured to electrically connect the first pad and the first connection.

9. The USB memory according to claim 1,
wherein
the adhesive film includes conductive particles provided between the first pad and the first connection and configured to electrically connect the first pad and the first connection.

10. The USB memory according to claim 9, wherein the adhesive film is an anisotropic conductive film.

11. The USB memory according to claim 1,
wherein
the wiring includes ground wiring,
the wiring board further includes a second pad exposed from the wiring board and electrically connected with the ground wiring, and
the connector further includes a third connection electrically connected with the second pad at the outer edge of the holder.

12. The USB memory according to claim 1, further comprising
a casing housing the wiring board and the connecter,
wherein
the connector and the casing are placed apart from each other.

13. A manufacturing method of a USB memory including a wiring board including wiring and a semiconductor chip electrically connected with the wiring and capable of data transfer by being connected with a receptacle, the manufacturing method comprising:
providing an adhesive film on the wiring board; and
bonding a holder of a connector including a first connection, a second connection electrically connected with the first connection and connectable with the receptacle, and the holder holding the first connection and the second connection to the wiring board via the adhesive film, and electrically connecting the first connection with the semiconductor chip via the wiring,
wherein
the wiring board further includes a first pad exposed from the wiring board and electrically connected with the wiring, and
the first connection is provided so as to be projected from a side face of the holder and electrically connected with the first pad at an outer edge of the holder.

14. The manufacturing method of the USB memory according to claim 13, further comprising providing the adhesive film of a thickness adjusted such that a distance between the wiring board and the holder is a predetermined distance on the wiring board.

15. The manufacturing method of the USB memory according to claim 13,
wherein
the wiring includes ground wiring,
the wiring board further includes a second pad exposed from the wiring board and electrically connected with the ground wiring, and
the connector further includes a third connection electrically connected with the second pad at the outer edge of the holder.

16. The manufacturing method of the USB memory according to claim 13, wherein
the USB memory further includes a casing housing the wiring board and the connecter, and
the connector and the casing are placed apart from each other.

17. A manufacturing method of a USB memory including a wiring board including wiring and a semiconductor chip electrically connected with the wiring and capable of data transfer by being connected with a receptacle, the manufacturing method comprising:
providing an adhesive film on a holder of a connector including a first connection, a second connection electrically connected with the first connection and connectable with the receptacle, and the holder holding the first connection and the second connection; and
bonding the holder to the wiring board via the adhesive film, and electrically connecting the first connection with the semiconductor chip via the wiring,
wherein
the wiring board further includes a first pad exposed from the wiring board and electrically connected with the wiring, and
the first connection is provided so as to be projected from a side face of the holder and electrically connected with the first pad at an outer edge of the holder.

18. The manufacturing method of the USB memory according to claim 17,
wherein
the wiring includes ground wiring,
the wiring board further includes a second pad exposed from the wiring board and electrically connected with the ground wiring, and
the connector further includes a third connection electrically connected with the second pad at the outer edge of the holder.

19. The manufacturing method of the USB memory according to claim 17, wherein
the USB memory further includes a casing housing the wiring board and the connecter, and
the connector and the casing are placed apart from each other.

* * * * *